G. R. MERKLEY.
BEVEL CUTTING SAW.
APPLICATION FILED NOV. 21, 1917.

1,273,393.

Patented July 23, 1918.
3 SHEETS—SHEET 1.

Inventor
George R. Merkley

By Henry L. Reynolds
Attorney

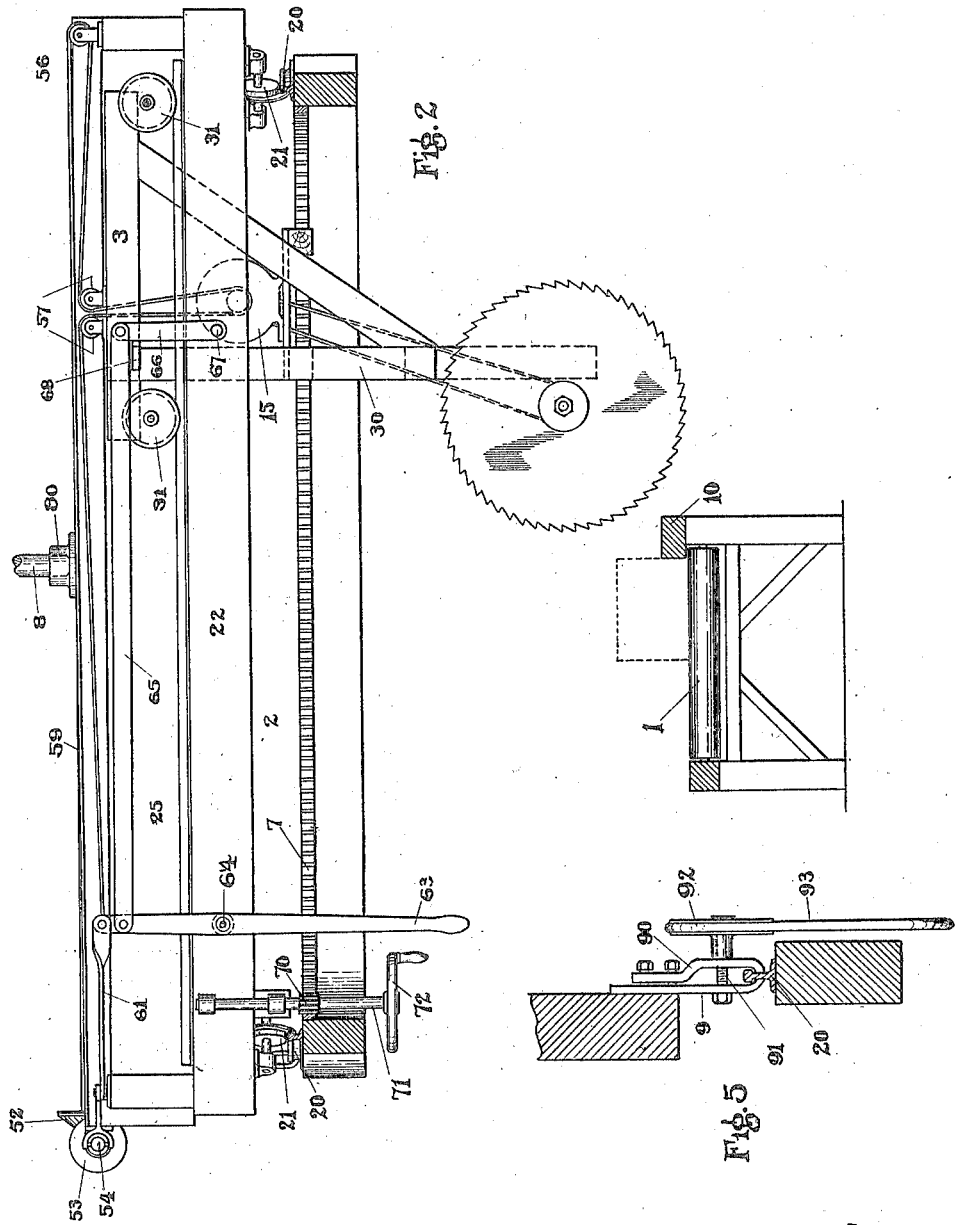

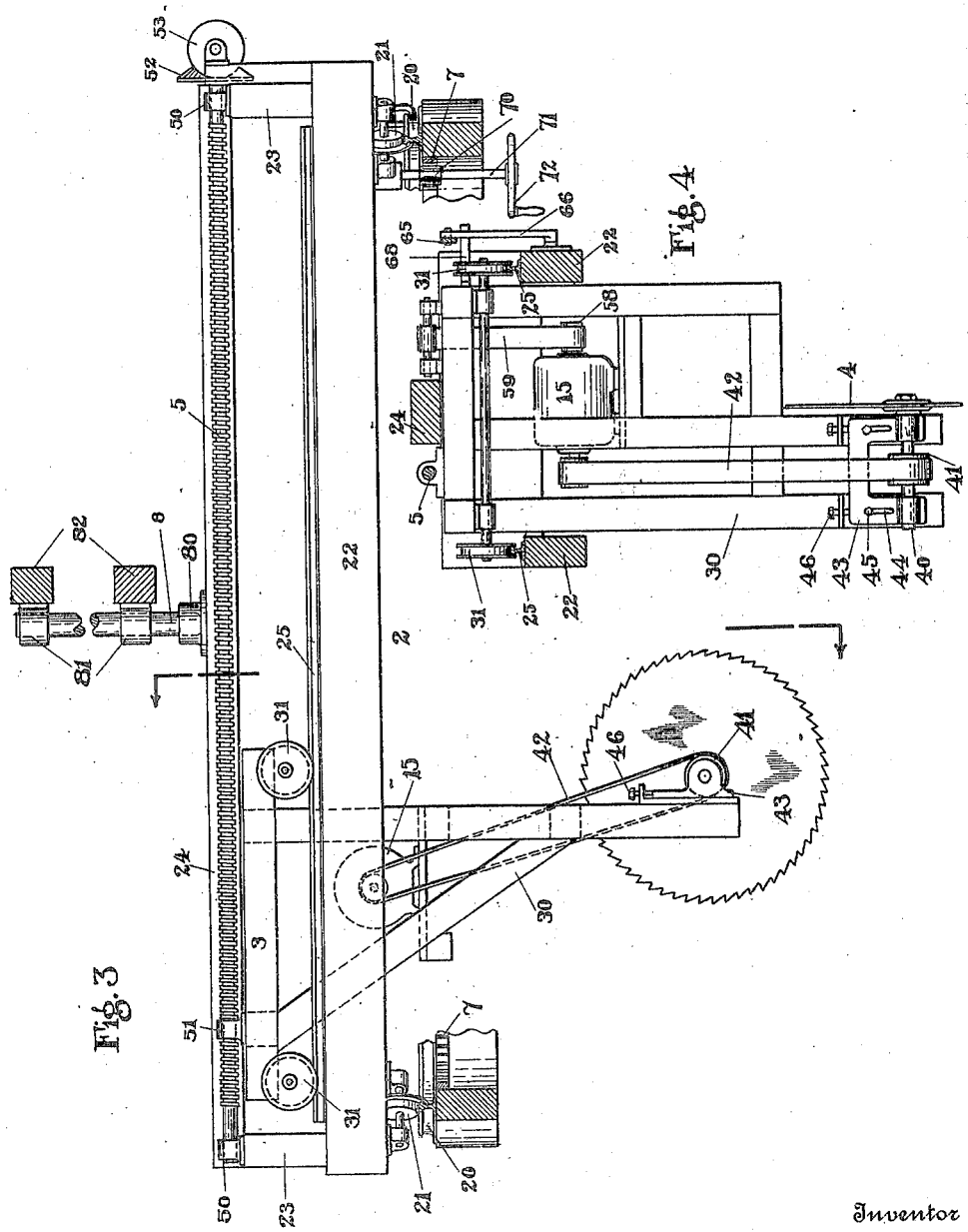

UNITED STATES PATENT OFFICE.

GEORGE R. MERKLEY, OF SEATTLE, WASHINGTON.

BEVEL-CUTTING SAW.

1,273,393.

Specification of Letters Patent.  Patented July 23, 1918.

Application filed November 21, 1917. Serial No. 203,072.

*To all whom it may concern:*

Be it known that I, GEORGE R. MERKLEY, a citizen of the United States, and resident of the city of Seattle, county of King, and State of Washington, have invented certain new and useful Improvements in Bevel-Cutting Saws, of which the following is a specification.

My invention relates to wood sawing machines and consists of an apparatus employing a saw and so constructed that it may be employed to cut timbers at any angle or bevel desired. The object of my invention is to provide a machine which is of simple and inexpensive construction and which may be easily and quickly adjusted to accurately and quickly cut a timber at any bevel or angle which may be desired. It is more particularly intended for cutting timbers of some size, such for instance as are employed in wooden ship building.

The novel features of my invention will be particularly pointed out in the claims which terminate this specification.

In the accompanying drawings I have shown my invention embodied in the form of construction which is now most preferred by me.

Figs. 2 and 3 are side views of the device taken from opposite sides.

Fig. 4 is a cross section of the turntable.

Fig. 5 is a detail showing the brake or turntable locking device.

Figure 1:
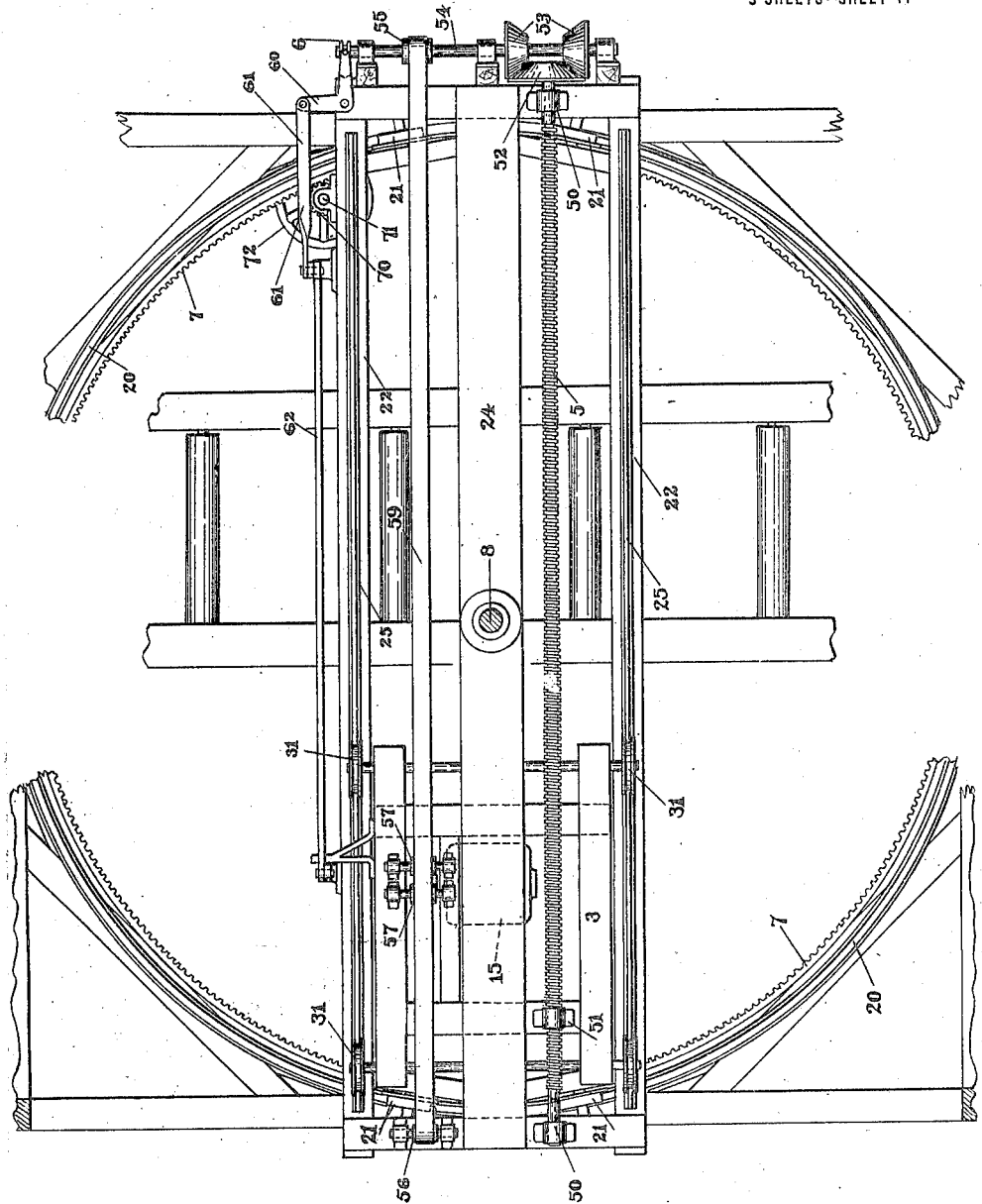
Figure 1 is a plan view of the device.

In carrying out my invention, I employ a carriage having a cutting member, as a saw, mounted thereon and a trackway upon which the carriage travels and with this a work holder, and provide means whereby the work holder and the trackway may be given relative angular adjustment about a vertical axis, so that timbers placed upon the holder may be cut at any angle. The saw should move at all times in a plane which includes the axis about which adjustment is made, and the timber holder should locate the timber so that one side face is in a plane which includes the same axis of adjustment. The preferred manner of doing this, and that illustrated, is as follows:

The work holder consists of a set of rolls 1, having a guide bar or stop 10 at one side serving to accurately locate the timber to be cut relative to the path of the saw as moved by the carriage and the vertical axis of adjustment. This axis should intersect the inner edge surface of the stop timber 10 and the plane of the saw should be an axial plane of the turntable.

In elevated position above the work holder is a circular trackway 20, upon which is a turntable or trackway supporting bridge or frame which has supporting wheels 21 running upon the circular track 20. The frame of this turntable is composed of two lower beams 22, spaced apart and carrying rails 25, and a raised central beam 24 connected at their ends by cross beams 23.

The carriage 3 may be of any suitable construction. It has a frame, as 30, extending downward and having a circular saw 4 journaled therein. This saw moves in an axial diametrical plane of the turntable. The arbor 40 of this saw is journaled upon a plate 43 which has slots 44 through which clamping bolts 45 pass, whereby adjustment of the saw shaft may be secured. Set screws 46 bearing against the plate 43 facilitate adjustment. Such adjustment is necessary as the saw wears and becomes of smaller diameter as it should approximately reach to the rolls 1.

In the upper part of frame 30, or in any suitable position to be carried by the carriage, is an electric motor 15. This is connected to drive the saw by belt 42. While other means for driving the saw from a power source without the apparatus may be employed, an individual electric motor is considered best.

The carriage is provided with wheels 31 which run on the rails 25 of the turntable. The travel of the carriage may be secured in various ways. That preferred and illustrated consists of a screw threaded shaft 5 mounted to turn in bearings 50 carried by the cross beams 23 of the turntable and threading into a nut 51 carried by the carriage.

At one end the shaft 5 has a bevel friction wheel 52 adapted to be driven from either of two bevel friction gears 53 carried by a common shaft 54. This shaft has a belt pulley 55 by which belt 59 drives it. The belt 59 passes over a pulley 56 at the opposite end of the turntable and its lower run over two guide pulleys 57 and thence over a pulley 58 carried by the motor shaft. The shaft 54 carrying the friction cones 53 is thus turning whenever the motor is running.

The shaft 54 is capable of movement in

its bearings lengthwise. At one end it has a grooved collar 6 which is engaged by a bell crank lever 60. A link or bar 61 connects this lever with the hand shifting lever 63 which is pivoted at 64 upon the turntable. A bar 65 is also connected with the hand shifting lever 63 and with a lever 66 pivoted at 67 to the opposite end of the turntable and in parallel relation with the lever 63. A stop bar or finger 68 carried by the carriage and projecting so as to contact with the levers 63 and 66, will, when it strikes one of these levers by reason of the movement of the carriage, shift the shaft 54 and thus separate the friction gears which were driving the carriage. The overtravel of the carriage in either direction is thus prevented.

The turntable 2 is turnable about its vertical axis by suitable means. That shown consists of an internally toothed gear or circular rack 7 mounted in fixed position adjacent the rail 20, with which engages a pinion 70 upon a shaft 71 which carries a hand wheel 72. This wheel is kept in elevated position to not interfere with the heads of workmen.

To insure greater accuracy in the position of the turntable than that which depends upon the accuracy of the circular rail 20, I prefer to employ a centering shaft 8 which enters a socket 80 carried by the turntable and bearings 81 carried by beams 82 of a frame structure. The axis of this shaft lies in the plane of movement of the saw and intersects the inner edge of the timber stop 10.

To secure the turntable in any adjusted position, as where a number of timbers are to be cut at the same angle, I provide a lock or clamp. This is shown in detail in Fig. 5 and consists of an arm or bar 9 fixed upon the turntable frame and having its lower end close against the web of the rail 20, and a second bar 90 which is loosely secured and has its lower end close to the other side of the rail web. A shaft 91 has threaded engagement with one of these bars, as 90, and a thrust or tension bearing upon the other. A wheel 92 on this shaft has an endless belt, rope or chain 93 passing over it and depending to a point where it may be conveniently engaged.

In using my device a timber is placed on the rolls 1 with one side contacting with the stop 10. The bevel at which it is to be cut is marked on its top surface, this line being placed in alinement with a point marked on the stop 10, which point is in the axis of the turntable. The turntable is then placed to aline the saw with this line and the carriage started. The timber will then be cut on the line marked and the cut will be truly vertical and accurate.

The stop 10 is cut through at the point which lies in the axis about which the turntable turns. The outer surface is also beveled back at a flat angle at each side of this point. The lower edge of the saw should just clear the rollers 1.

By removing the stop or by moving it laterally, this saw may be used to rip short timbers.

What I claim as my invention is:

1. A beveling device for timbers comprising an elevated circular trackway, a turntable movable on said circular trackway and having a diametrically positioned trackway thereon, a carriage movable on the turntable trackway, a saw carried upon and depending from said carriage, and a pivot axis for said turntable engaging the same from above.

2. A beveling device for timbers comprising an elevated turntable having a trackway thereon, a carriage movable on said trackway and diametrically of its axis of swing, a saw mounted on said carriage to move in an axial plane of the turntable, and a timber holder having a stop with its active face in an axial plane of the turntable.

3. A machine for beveling timbers comprising an elevated trackway mounted to turn about a vertical axis, a carriage movable along said trackway in directions radiating from said axis, a saw carried by and projecting from the carriage said saw occupying and moving in a plane which includes said circular axis, and a timber holder having a timber stopping face which is diametrical with said axis.

4. A machine for beveling timber comprising an elevated circular trackway, a turntable bridge turnably supported on said trackway and having tracks paralleling a diameter of the circular trackway, a fixed pivot engaging said turntable bridge, a carriage movable on said bridge trackway, a saw depending from said carriage and occupying a plane which includes the axis of the circular trackway, and a timber support having a timber stopping face which intersects the same axis.

5. A machine for beveling timber comprising an elevated circular trackway, a turntable rotatably supported on said circular trackway, a pivot shaft positioned axially of the said circular trackway and engaging the turntable from above, a carriage movable on the turntable diametrically of its pivot axis, a saw carried by said carriage to occupy an axial plane of said pivot, and a timber holder having a stop face which is also in an axial plane.

Signed at Seattle, Washington, this 9th day of November, 1917.

GEORGE R. MERKLEY.